No. 651,294. Patented June 5, 1900.
F. BURGER & H. M. WILLIAMS.
FEED WATER PURIFIER.
(Application filed July 18, 1899.)
(No Model.)
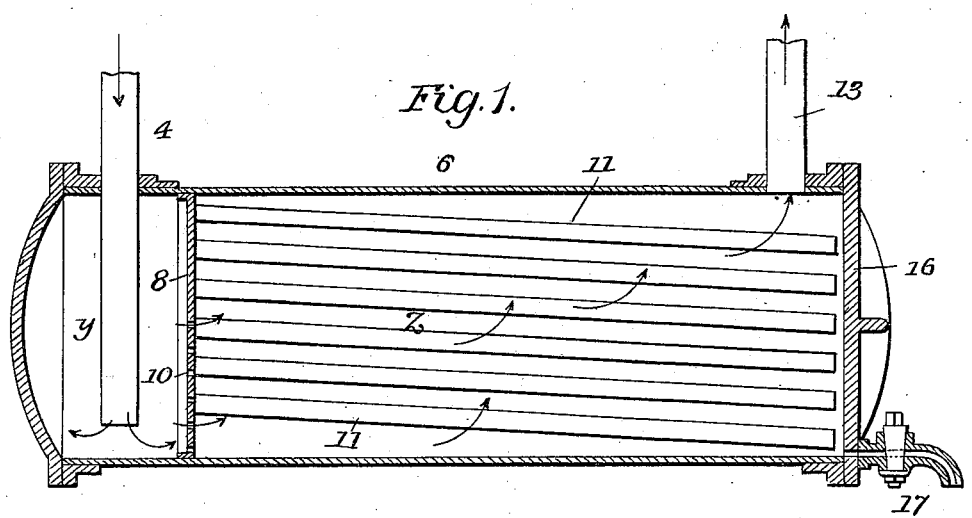
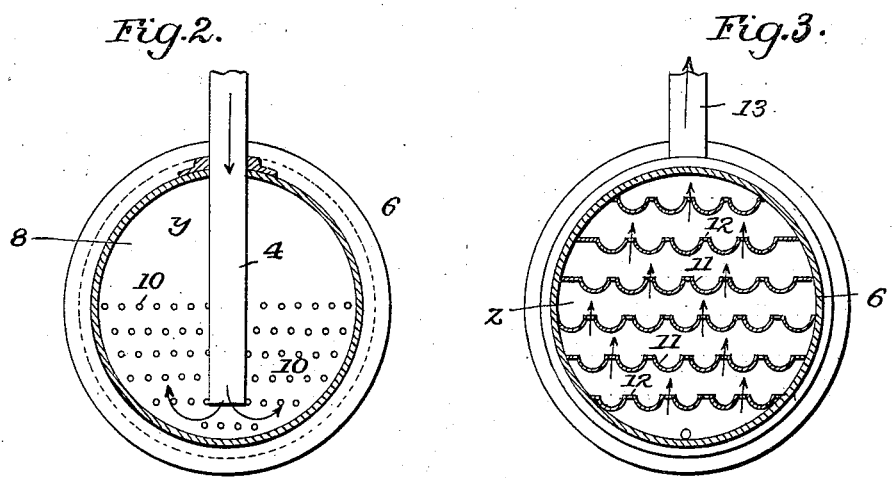
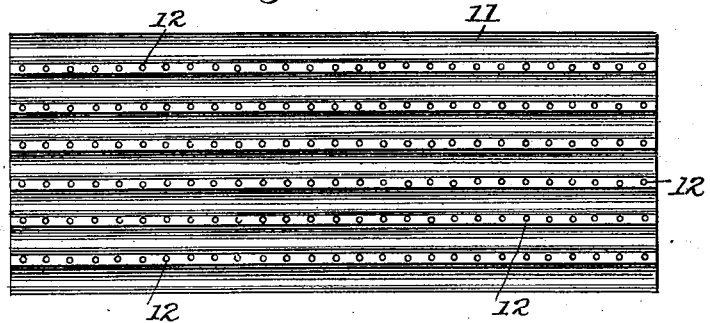

UNITED STATES PATENT OFFICE.

FRANZ BURGER AND HENRY M. WILLIAMS, OF FORT WAYNE, INDIANA; SAID BURGER ASSIGNOR OF ONE-HALF TO SAID WILLIAMS.

FEED-WATER PURIFIER.

SPECIFICATION forming part of Letters Patent No. 651,294, dated June 5, 1900.

Application filed July 18, 1899. Serial No. 724,252. (No model.)

*To all whom it may concern:*

Be it known that we, FRANZ BURGER and HENRY M. WILLIAMS, citizens of the United States, residing at Fort Wayne, in the county of Allen and State of Indiana, have invented certain new and useful Improvements in Feed-Water Purifiers, of which the following is a specification.

Our invention relates to feed-water purifiers for steam-boilers; and it consists of certain improved constructions and arrangement of parts, as fully set forth hereinafter and illustrated in the accompanying drawings, in which—

Figure 1 is a longitudinal sectional view of a purifier constructed in accordance with our invention; Fig. 2, a transverse sectional view through the inlet-chamber. Fig. 3 is a similar view taken intermediate the ends of the settling-chamber; Fig. 4, a plan view of one of the horizontal partitions in the settling-chamber.

Preferably the shell or casing 6 is cylindrical, as shown; but it may be otherwise formed, and preferably the heads 16 will be removable. The casing is provided interiorly with a vertical partition 8, dividing it into chambers $y$ $z$ of unequal dimensions, the smaller chamber, $y$, being the inlet-chamber and the other, $z$, the settling-chamber. The inlet-pipe 4 will lead, preferably, from some feed-water heater, (not shown,) and its discharge end extends nearly to the bottom of the chamber $y$. The lower portion of the partition is provided with a series of small perforations 10, which afford communication between the two chambers.

In the chamber $z$ are a number of slightly-inclined and perforated corrugated longitudinal partitions 11, the corrugations constituting a series of parallel longitudinal troughs, between which are perforations 12. (Best seen in Figs. 3 and 4.) The partitions 11 abut against the partition 8, but do not engage the head 16 of the chamber $z$, and preferably they will be removably attached to the casing in order that they may be removed for cleaning or other purposes. As shown in Figs. 3 and 4, the perforations 12 are formed in parallel rows in the highest parts of the several partitions and a trough extends between adjacent rows. An outlet-pipe 13 leads from the upper part of the chamber $z$, and there is a blow-off cock 17 communicating with the bottom of this chamber. The pipe 13 is of course intended to communicate with the boiler.

In operation the heated water will flow through the pipe 4 into the chamber $y$ and then through the perforations into the chamber $z$, through the perforations 12 in the partitions, and thence through pipe 13 to the boiler. Most of the floating matter which may be carried by the water will be retained in the chamber $y$; but in this chamber the water will not have a chance to deposit its lime, mud, &c., to any great extent. When, however, it is passing upwardly through the partitions in the chamber $z$, it will deposit its lime, mud, &c., in the trough of the partitions, and it will be observed that the water passes through the partitions in an upward direction at the edges of the troughs and the currents will not therefore come into contact with the deposits in the troughs, and therefore such deposits having once settled in the troughs will not be again disturbed by the water as long as its avenue of escape is the pipe 13.

The deposits may be removed by opening the blow-off cock 17 and permitting the water to wash them out, and this is facilitated by the inclination of the partitions and the fact that there is an open space between their ends and the head 16, which forms a channel common to all of them leading to the blow-off cock. The head 16 may also be removed and the deposits scraped off the partitions, or the latter may be removed for the purpose of cleaning them.

Having described the invention, we claim—

1. A water-purifier for steam-boilers, comprising a casing provided with an interior vertical partition dividing it into two chambers, said partition being perforated in its lower portion, an inlet-pipe leading into one chamber, an outlet-pipe leading from the other chamber, and a series of longitudinal, perforated partitions in the latter chamber, the inlet and outlet pipes being arranged to cause the water to flow upwardly through the perforations in the longitudinal partitions, substantially as set forth.

2. A water-purifier for steam-boilers comprising a casing with a vertical partition dividing it into two chambers, said partition being perforated, a pipe 4 leading into one chamber, a pipe 13 leading from the other chamber, and a series of longitudinal partitions 11 in the latter chamber, each of said partitions 11 abutting at one end against the vertical partition and terminating a short distance from the other end of the chamber, and each partition 11 being perforated and formed with longitudinally-extending troughs, the inlet and outlet pipes being arranged to cause the water to flow upwardly through the perforations in the longitudinal partitions, substantially as set forth.

3. A water-purifier for steam-boilers, comprising a casing divided into two chambers by a perforated vertical partition, an inlet-pipe leading into one chamber, and an outlet-pipe leading from the other chamber, and a series of inclined longitudinal partitions 11 in the latter chamber, each partition being formed with parallel longitudinally-extending troughs, and rows of perforations between the edges of said troughs, substantially as set forth.

4. In a water-purifier for steam-boilers, a settling-chamber provided with a series of parallel inclined partitions 11, each formed with a series of longitudinally-extending troughs and perforations at the edges of the troughs, said partitions abutting against one end of the chamber and terminating a short distance from the other end thereof, a blow-off cock at the latter end of the chamber, means to introduce water into said chamber at the other end, and an outlet-pipe leading from the upper part of the chamber, substantially as set forth.

5. A water-purifier for steam-boilers, comprising a casing provided with a series of parallel partitions inclining slightly from a horizontal plane, each partition formed with a series of parallel troughs and perforations at the edges of the troughs, and inlet and outlet pipes arranged to cause the water to flow upwardly through the perforations in the partitions, substantially as set forth.

In testimony whereof we have signed our names to this specification in the presence of two subscribing witnesses.

FRANZ BURGER.
HENRY M. WILLIAMS.

Witnesses:
GEO. K. TORRENCE,
JOHN B. FORMER.